United States Patent [19]
Hulsing, II

[11] Patent Number: 5,456,110
[45] Date of Patent: Oct. 10, 1995

[54] DUAL PENDULUM VIBRATING BEAM ACCELEROMETER

[75] Inventor: Rand H. Hulsing, II, Redmond, Wash.

[73] Assignee: AlliedSignal Inc., Morris Township, N.J.

[21] Appl. No.: 151,410

[22] Filed: Nov. 12, 1993

[51] Int. Cl.$^6$ .............................. G01P 9/04; G01P 15/08
[52] U.S. Cl. .................... 73/514.38; 73/514.35
[58] Field of Search ................... 73/DIG. 1, 862.59, 73/517 AV, 517 B, 517 R, 516 R, DIG. 4, 497

[56] References Cited

U.S. PATENT DOCUMENTS

| | | | |
|---|---|---|---|
| 4,510,802 | 4/1985 | Peters | 73/517 R |
| 4,517,841 | 5/1985 | Peters et al. | 73/517 AV |
| 4,766,768 | 8/1988 | Norling et al. | 73/517 AV |
| 4,945,765 | 8/1990 | Roszhart | 73/517 AV |
| 5,005,413 | 4/1991 | Novack et al. | 73/517 AV |
| 5,239,870 | 8/1993 | Kaneko | 73/517 R |
| 5,241,861 | 9/1993 | Hulsing, II | 73/505 |

*Primary Examiner*—Hezron E. Williams
*Assistant Examiner*—Christine K. Oda
*Attorney, Agent, or Firm*—Howard G. Massung

[57] ABSTRACT

A micromachined push-pull accelerometer formed with dual vibrating beam transducers in one plane of a silicon substrate includes a pair of proof masses or pendulums supported by flexures formed in a plane adjacent a surface of the silicon substrate opposite the vibrating beam transducers on opposing sides of the pendulums to define opposing pendulous axes. The accelerometer is configured such that the dual vibrating beam transducers are in a push-pull relationship (e.g., one transducer is subjected to a tension force while the other transducer is subjected to a compression force in response to accelerations along a sensitive axis SA). In order to form the push-pull configuration, one vibrating beam transducer is connected to one pendulum on a side opposite the hinge axis for that pendulum while the other vibrating beam transducer is connected to the other pendulum on the same side as the hinge axis for that pendulum. Such a configuration not only provides for cancellation of cross-axis acceleration over a relatively wide frequency range but, in addition, provides an effective sensitive axis SA, generally perpendicular to the surface of the silicon substrate, thus obviating the need for a special mounting structure while obviating the problem relating to the rotation of the input axis. The configuration also enables the electrically conductive material for the electrodes to be deposited on one side of the substrate, thus simplifying the fabrication of the accelerometer.

20 Claims, 3 Drawing Sheets

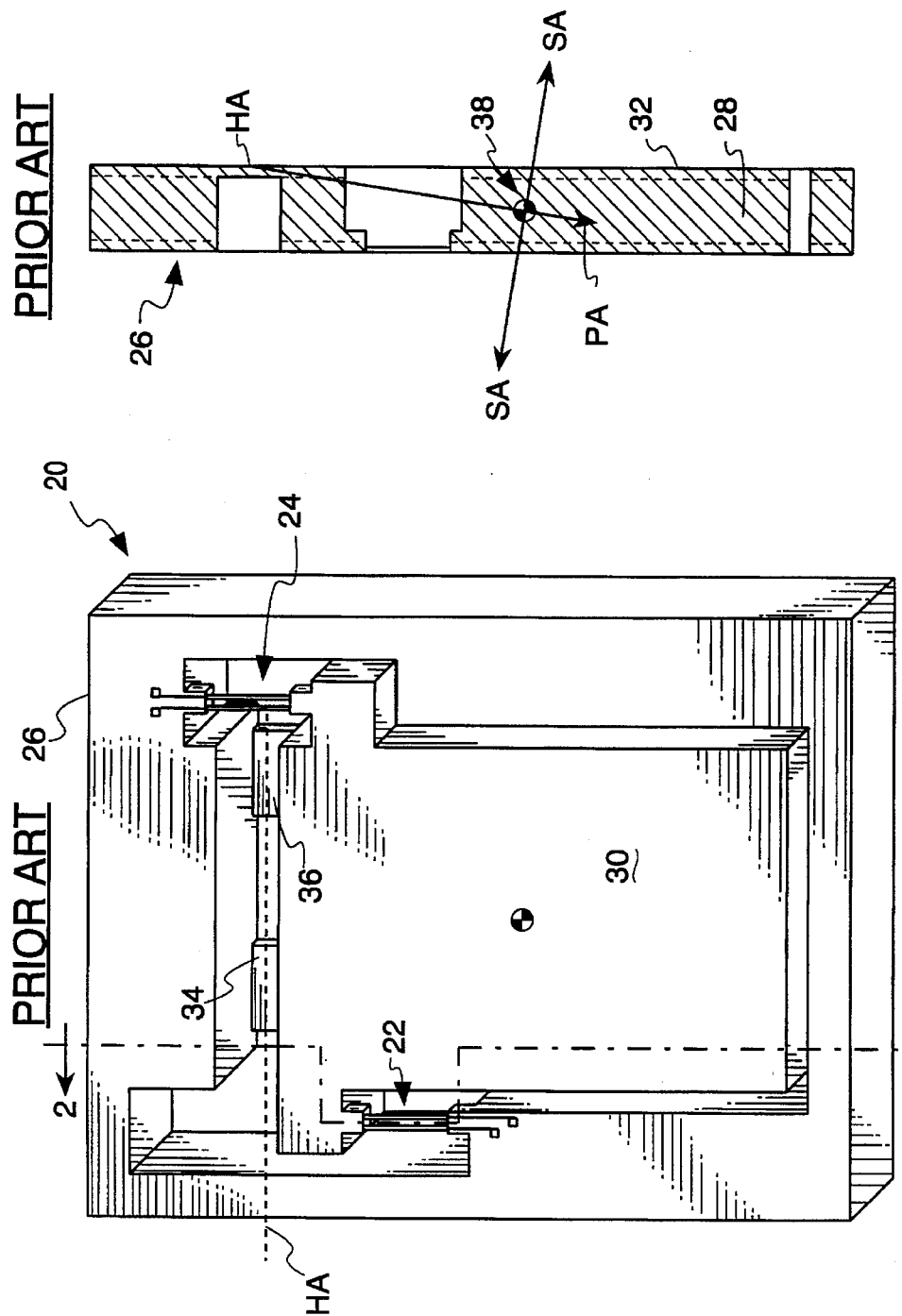

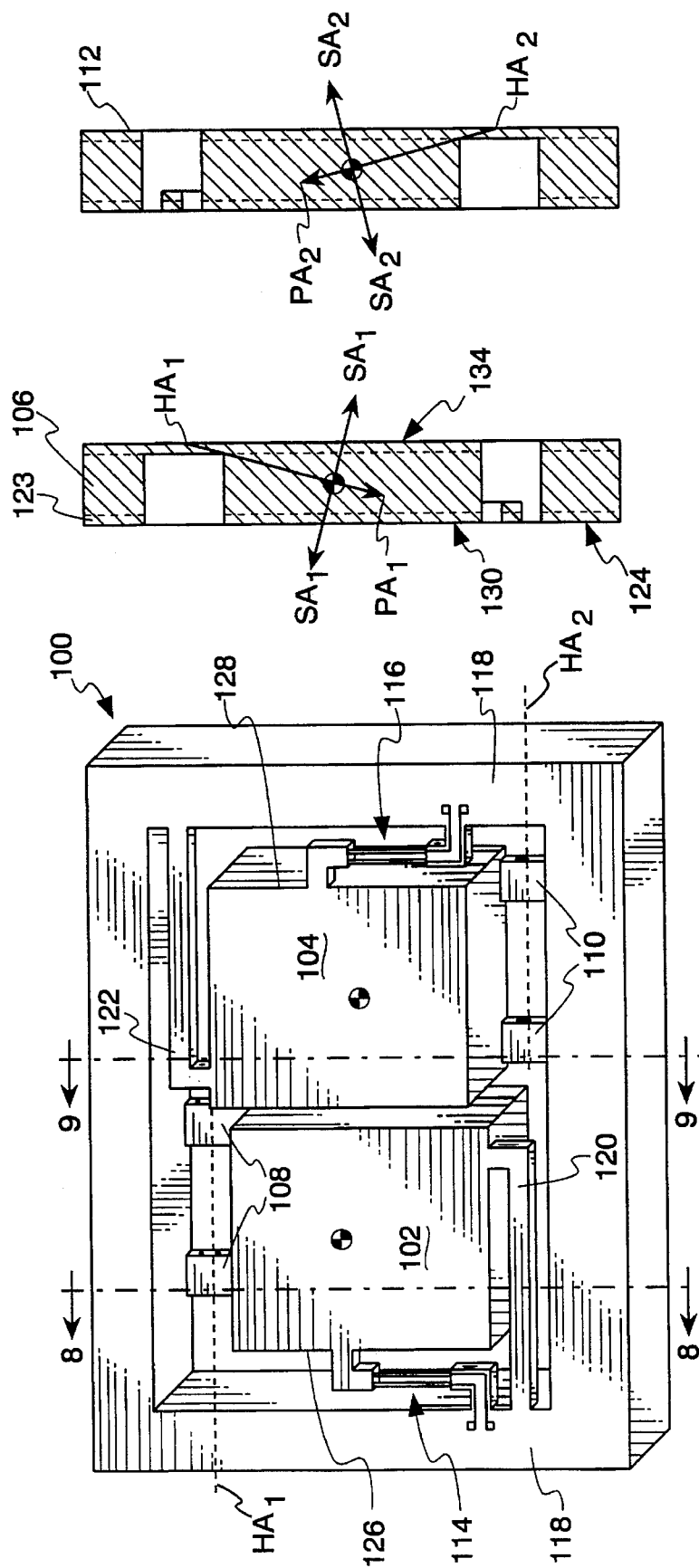

DUAL PENDULUM VIBRATING BEAM ACCELEROMETER

BACKGROUND OF THE INVENTION

1. Field of the Invention

The invention relates to an accelerometer for measuring accelerations along a sensitive axis and, more particularly, to a micromachined vibrating beam accelerometer formed with dual pendulums in one plane which compensates for errors due to cross-axis acceleration without the need for a special mounting structure.

2. Description of the Prior Art

Vibrating beam accelerometers are generally known in the art. An example of such an accelerometer is disclosed in U.S. Pat. No. 5,005,413. Such an accelerometer is formed with a pair of vibrating beam transducers in one plane and configured in a push-pull arrangement such that accelerations along the sensitive axis will cause compression force on one of the vibrating beam transducers and a tension force on the other. The push-pull configuration provides for compensation of various common mode errors, such as vibration rectification errors and certain errors induced by temperature change and drift of the clock frequency. In order to optimize the compensation for the common mode errors, the force transducers must be formed to have nearly identical common mode responses. Various configurations are known for forcing the transducers to have nearly identical common mode responses.

For example, certain accelerometers, such as the accelerometer disclosed in the '413 patent, are formed by micromachining; a technique for fabricating accelerometers from a silicon substrate in a manner similar to the manner in which integrated circuits are fabricated. In order to form the transducers in such an accelerometer in a push-pull relationship, the transducers must be formed either in planes adjacent opposing surfaces of the silicon substrate or in one plane in order to create the push-pull configuration. However, there are various known problems with both alternatives.

In particular, accelerometers formed with vibrating beam transducers in planes adjacent opposing surfaces of the silicon substrate are known to not adequately compensate for common mode errors. The reason for this is that the transducers are formed from different physical layers of the silicon substrate. By forming the vibrating beam transducers in different physical layers of the silicon substrate, the transducers are known to not have well matched common mode responses.

In an attempt to solve this problem, the accelerometer disclosed in the '413 patent is formed with both vibrating beam transducers formed in one plane adjacent one surface of the silicon substrate. By forming both of the vibrating beam transducers in a single plane, the common mode responses of such transducers will be relatively well matched. However, such a configuration creates other problems. For example, such a configuration results in a small angular offset or tilting of the sensitive axis SA (e.g., 6°) which can cause errors in the accelerometer output signal due to cross-axis acceleration. In order to compensate for the tilting of the sensitive axis SA, it is known to mount such accelerometers with a special mounting structure that compensates for the tilting of the sensitive axis.

Although the problem relating to the tilting of the sensitive axis SA can be corrected by utilizing a special mounting structure, there is another problem with such a configuration that is not solved with the use of a special mounting structure. This problem relates to rotation of the sensitive axis SA as a function of the G input. This problem is best understood with reference to FIGS. 1 and 2, which illustrate the accelerometer disclosed in the '413 patent. In particular, the accelerometer 20 is formed with dual vibrating beam transducers 22 and 24 in a single plane adjacent a top surface 26 of the silicon substrate 28. A proof mass 30, formed along the width of the silicon substrate 28, is supported in a plane adjacent a bottom surface 32 of the silicon substrate 28 by a pair of flexures 34 and 36, which define a hinge axis HA. As best shown in FIG. 2, the pendulous axis PA is defined between the center of mass 38 of the proof mass 30 and the hinge axis HA. The center of mass 38 is approximately in the middle of the thickness of the silicon substrate 28 and, since the flexures 34 and 36 are formed along the bottom surface 32, the pendulous axis PA will not be parallel to the plane of the silicon substrate 28. Rather, the pendulous axis PA will be angularly offset or tilted relative to the plane of the silicon substrate 28 by a certain amount as shown, for example, 6°. Since the sensitive axis SA by definition is normal to the pendulous axis PA, the sensitive axis SA will be tilted relative to the plane of the silicon substrate 28 by the same amount.

As the proof mass 30 rotates about the hinge axis HA, the center of mass 38 will likewise rotate. Such rotation of the center of mass 38 will cause rotation of the pendulous axis PA in the plane of the pendulous axis PA and, consequently, will result in rotation of the sensitive axis SA. Such rotation of the sensitive axis SA will be a function of the G input. In some known accelerometers, the rotation of the sensitive axis SA can be on the order of 1 milliradian at maximum G input, resulting in relatively significant errors in the accelerometer output signal.

SUMMARY

It is an object of the present invention to solve various problems in the prior art.

It is another object of the present invention to provide a micromachined push-pull accelerometer.

It is yet another object of the present invention to provide a micromachined push-pull accelerometer formed with dual vibrating beam transducers formed in one plane of a silicon substrate which compensates for errors due to cross-axis acceleration.

It is yet a further object of the present invention to provide a micromachined push-pull accelerometer formed with dual vibrating beam transducers in one plane of a silicon substrate which obviates the need for a special mounting structure.

It is yet a further object of the present invention to provide a micromachined push-pull accelerometer which compensates for errors resulting from rotation of the sensitive axis.

Briefly, the present invention relates to a micromachined push-pull accelerometer formed with dual vibrating beam transducers in one plane of a silicon substrate which includes a pair of proof masses or pendulums supported by flexures formed in a plane adjacent a surface of the silicon substrate opposite the vibrating beam force transducers on opposing sides of the pendulums to define opposing pendulous axes. The accelerometer is configured such that the dual vibrating beam transducers are in a push-pull relationship (e.g., one transducer is subjected to a tension force while the other transducer is subjected to a compression force in response to accelerations along a sensitive axis SA). In order to form the push-pull configuration, one vibrating beam transducer is connected to one pendulum on a side opposite the hinge axis for that pendulum while the other vibrating beam transducer is connected to the other pendulum on the same side as the hinge axis for that pendulum. Such a configuration not only provides for cancellation of cross-axis acceleration over a relatively wide frequency range but, in addition, provides an effective sensitive axis SA, generally perpendicular to the surface of the silicon substrate, thus obviating the need for a special mounting structure while obviating the problem relating to the rotation of the input axis. The configuration also enables the electrically conductive material for the electrodes to be deposited on one side of the substrate, thus simplifying the fabrication of the accelerometer.

BRIEF DESCRIPTION OF THE DRAWING

These and other objects of the present invention will be readily apparent from the following specification and attached drawing, wherein:

FIG. 1 is a perspective view of a known micromachined push-pull accelerometer as disclosed in U.S. Pat. No. 5,005,413;

FIG. 2 is a cross-sectional view of the accelerometer illustrated in FIG. 1 taken along line 2—2 of FIG. 1;

FIG. 7 is an alternate embodiment of a micromachined push-pull accelerometer in accordance with the present invention;

FIG. 8 is a cross-sectional view of the accelerometer illustrated in FIG. 7 along line 8—8 of FIG. 7; and FIG. 9 is a cross sectional view of the accelerometer illustrated in FIG. 7 along line 9—9 of FIG. 7.

DETAILED DESCRIPTION OF THE PREFERRED EMBODIMENT

Figure 4:
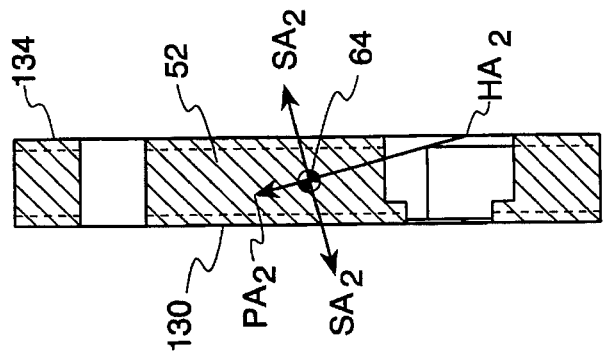
FIG. 4 is a cross-sectional view of the accelerometer illustrated in FIG. 3 along line 4—4 of FIG. 3.
Figure 3:
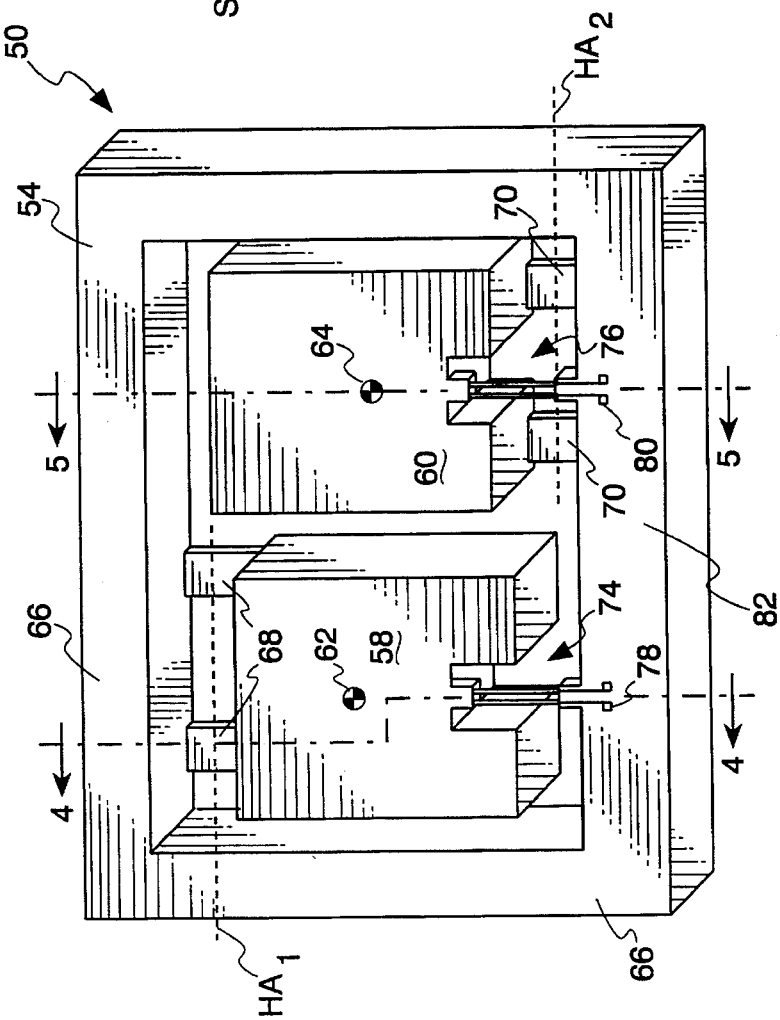
FIG. 3 is a perspective view of micromachined push-pull accelerometer in accordance with the present invention.

FIG. 3 is a perspective view of one embodiment of the micromachined push-pull accelerometer in accordance with the present invention. The accelerometer, generally identified with the reference numeral 50, may be formed from a generally planar and rectangular silicon substrate 52 having an upper surface 54 and a lower surface 56 (FIGS. 3 and 4). The silicon substrate 52 is etched by conventional etching techniques to form a pair of proof masses or pendulums 58 and 60 having centers of mass 62 and 64, respectively. The proof masses 58 and 60 are attached to a portion of the silicon substrate 52 (which forms a support 66) by pairs of flexures 68 and 70. The pairs of flexures 68 and 70 are formed in a single plane or layer 72 of the silicon substrate 52 adjacent the lower surface 56. The flexures 68 and 70 enable the proof masses 58 and 60 to rotate with respect to the support 66 about hinge axes HA1 and HA2. Since the proof masses 58 and 60 are supported on opposite sides with respect to each other by the flexures 68 and 70, the hinge axes HA1 and HA2 will be generally parallel, but spaced apart, as shown in FIG. 3.

Figure 5:
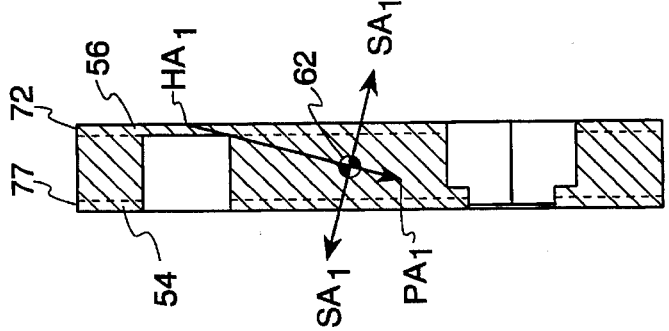
FIG. 5 is a cross-sectional view of the accelerometer illustrated in FIG. 3 along line 5—5 of FIG. 3.

As best shown in FIGS. 4 and 5, a pendulous axis is defined for each of the pendulums 58 and 60. In particular, the pendulous axis PA1 is defined for the pendulum 58. This pendulous axis PA1 extends from the hinge axis HA1 through the center of mass 62 of the pendulum 58. Similarly, the pendulous axis PA2 extends from the hinge axis HA2 through the center of mass 64 of the pendulum 60 since the pendulums 58 and 60 are supported on opposite sides with respect to each other, the pendulous axes PA1 and PA2 will extend in opposing directions as shown in FIGS. 4 and 5.

These pendulous axes PA1 and PA2 define sensitive axes SA1 and SA2, respectively. The sensitive axis SA1 for the pendulum 58 is perpendicular to the pendulous axis PA1 and to the hinge axis HA1. Similarly, the sensitive axis SA2 for the pendulum 60 is perpendicular to the pendulous axis PA2 and to the hinge axis HA2. Since the pendulous axes PA1 and PA2 extend in different directions, the sensitive axes SA1 and SA2 will likewise extend in different directions.

Figure 6:
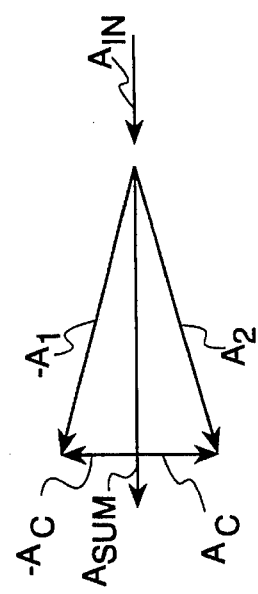
FIG. 6 is a vector diagram illustrating the cancellation of the cross axis acceleration for the accelerometer illustrated in FIG. 3.

The configuration of the sensitive axes SA1 and SA2 causes the cross axis acceleration components to cancel at all G inputs and provides an effective sensitive axis that is generally perpendicular to the surface of the silicon substrate 52 which obviates the need for a special mounting structure and also solves the problem related to rotation of the sensitive axis. This is shown vectorially in FIG. 6. In particular, as will be discussed in more detail below, the pendulums 58 and 60 are attached to the support 66 with vibrating beam force transducers 74 and 76 as shown in FIG. 3. As such, when an acceleration $A_{IN}$ is applied in a direction generally perpendicular to the plane of the silicon substrate 52 as shown, the vibrating beam transducer 74 will go into tension while the vibrating transducer 76 goes into compression. As shown in FIG. 6, the acceleration of the pendulum 58 will be as represented by the vector $A_1$, generally parallel to the sensitive axis SA1. This vector $A_1$ includes a cross-axis acceleration $A_C$ component. However, this cross-axis acceleration component $A_C$ is canceled out due to the configuration of the accelerometer 50. In particular, the acceleration $A_{IN}$ results in an acceleration $A_2$ of the pendulum 60. Since the vibrating beam transducer 74 is in tension while the vibrating beam transducer 76 is in compression, this acceleration is negative, $-A_1$. This acceleration $-A_1$ also includes a cross-axis acceleration component $-A_C$. However, this cross-axis acceleration component $-A_C$ is equal to $A_C$, but of opposite polarity, resulting in a cancellation of the cross-axis acceleration component $A_C$ and $A_C$. By canceling the cross-axis acceleration components of the pendulums 58 and 60, the resulting acceleration $A_{SUM}$ will be generally perpendicular to the plane of the silicon substrate $SA_{eff}$ 52, thus providing an effective sensitive axis SA for the accelerometer 50 that is normally perpendicular to the plane of the silicon substrate 52. Since the effective sensitive axis $SA_{eff}$ is perpendicular to the plane of the silicon substrate 52, the need for a special mounting surface is eliminated. In addition, the configuration also solves the problem with respect to rotation of the sensitive axes since the cross-axis acceleration components will cancel for all G inputs.

The transducers 74 and 76 are formed as vibrating beam transducers which include a pair of beams which oscillate 180° out of phase with one another in the plane of the beams. Such transducers 74 and 76 are known as force-to-frequency transducers since a change in the force applied to the transducer will result in a change of the resonant frequency of the transducer. In particular, a tension force applied along an axis generally parallel to the beams will cause an increase of the resonant frequency while a compression force will generally decrease the resonant frequency.

Both vibrating beam force transducers 74 and 76 are formed in a single layer 77 of the silicon substrate 52 such that they are generally parallel to each other as well as parallel to their respective pendulous axes PA1 and PA2 and connected to a common leg 82 of the support 66. Not only does such a configuration provide virtually identical common response for the transducers 74 and 76, but additionally simplifies construction of the accelerometer 50 by enabling the pairs of electrodes 78 and 80 to be formed on one side of the substrate 52.

Due to the configuration of the pairs of flexures 68 and 70, the vibrating beam transducer 74 is disposed on the opposite side of the pendulum 58 as the hinge axis HA1, while the vibrating beam transducer 76 is disposed on the same side as the hinge axis HA2 for the pendulum 60. By so configuring the vibrating beam transducers 74 and 76 relative to the hinge axes HA1 and HA2, the transducers 74 and 76 will be in a push-pull relationship. In particular, as discussed above, an acceleration normal to the plane of the silicon substrate 52 in a direction out of the page with reference to FIG. 3 will cause the vibrating beam transducer 76 to go into tension and the vibrating beam transducer 74 to go into compression. Similarly, an acceleration applied in a direction generally perpendicular to the plane of the silicon substrate in a direction into the page with reference to FIG. 3 will cause the vibrating beam transducer 76 to go into compression, while the vibrating beam transducer 74 goes into tension, thus forming a push-pull relationship between the two transducers 74 and 76.

An alternate embodiment of the invention is shown in FIGS. 7, 8 and 9. This accelerometer, generally identified with the reference numeral 100, is similar to the accelerometer 50 and includes a pair of proof masses or pendulums 102 and 104 that are attached to a silicon substrate 106 by two pairs of flexures 108 and 110, respectively. These pairs of flexures 108 and 110 are formed in a layer 112 of the silicon substrate 106 adjacent a bottom surface 134 of the substrate 106 defining hinge axes HA1 and HA2, respectively. The accelerometer 100 includes a pair of vibrating beam transducers 114 and 116 connected between a support 118 and the pendulums 102 and 104.

In order to prevent torsion about the respective pendulous axes PA1 and PA2 due to off-center position of the beams of the vibrating beam transducers 114 and 116, a pair of struts 120 and 122 are provided. The struts 120 and 122 are formed in a layer 123 adjacent a top surface 124 of the silicon substrate 106. These struts 120 and 122 are formed to be on a side of the pendulums 102 and 104 opposite the hinge axes HA1 and HA2, respectively. In order to accommodate the struts 120 and 122 and also to provide relatively well matched response to common mode errors for the transducers 114 and 116, the transducers 114 and 116 are attached between the support 118 and sides 126 and 128 of the pendulums 102 and 104, respectively, as shown in FIG. 7, adjacent the hinge axis HA2 unlike the accelerometer 50 wherein the transducers 74 and 76 are connected to span the hinge axis HA2. This configuration places the vibrating beam transducers 114 and 116 in a push-pull relationship similar to the transducers 74 and 76.

The accelerometers 50 and 100 shown in FIGS. 3 and 7 can be fabricated in a number of ways using conventional silicon micromachining techniques. For example, the silicon substrates 52 and 106 can be formed from a generally planer and rectangular substrate formed from a P-type material with surfaces oriented along various crystal planes. An N-type epitaxial layer 130 can be grown on the upper surfaces 54 and 124. A second N-type epitaxial layer 34 can be grown on the lower surfaces 56 and 112. The substrates 52 and 106 are then etched to form the structures illustrated in FIGS. 3 and 7, with electrochemical etch stops used to prevent etching of the force transducers 74, 76 and 114, 116 from the epitaxial layer 130 and the flexures 68, 70 and 108, 110 from the epitaxial layer 134, while deep etching of the bulk silicon is being performed.

Although the accelerometers 50 and 100 have been described utilizing vibrating beam force transducers, the principals of the present invention are also applicable to accelerometers which use other types of transducers, such as piezo-resistive strain gauges, piezoelectric transducers and surface acoustic wave transducers. In all embodiments, it is desirable to match the thermal coefficient of expansion of the transducers to the coefficient of expansion of the material from which the proof masses and supports are fabricated to minimize thermal restraints on the transducers. This is accomplished in silicon micromachined devices by controlling doping concentrations.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method for making a micromachined accelerometer from a generally rectangular silicon substrate having upper and lower surfaces for measuring acceleration along a predetermined axis, comprising the steps of:

(a) forming first and second pendulums defining opposing ends in said substrate and defining a support portion;

(b) forming at least one flexure in a single plane adjacent the lower surface of said substrate for each of said first and second pendulums defining first and second hinge axes, respectively, to enable said first and second pendulums to rotate relative to said support portion, said first and second hinge axes being disposed on said opposing ends of said support portion;

(c) forming a first force transducer in a single plane adjacent said upper surface, connected between said support portion of said substrate and said first pendulum; and (d) forming a second force transducer in a single plane adjacent said upper surface of said substrate, connected between said support portion and said second pendulum, wherein said first and second transducers are configured in a push-pull arrangement, said first and second force transducers both connected to said support portion adjacent at least one of said first hinge axis or said second hinge axis.

2. A method as recited in claim 1, wherein said first and second force transducers are formed as vibrating beam force transducers.

3. A method as recited in claim 1, wherein both of said first and second force transducers span at least one of said first or second hinge axes.

4. A method as recited in claim 1, wherein both of said first and second force transducers are disposed adjacent at least one of said first or second hinge axes.

5. A method as recited in claim 4, further including the step of forming first and second struts in said substrate for reducing torsion relative to said first and second force transducers.

6. A method as recited in claim 5, wherein said first and second struts are formed adjacent said upper surface of said substrate.

7. A method as recited in claim 5, wherein each of said struts is formed adjacent ends of said pendulums opposite their respective hinge axes.

8. A push-pull accelerometer for measuring accelerations along a predetermined axis, comprising:

a generally planar support defining opposing ends;

first and second pendulums having first and second centers of mass;

at least one flexure for rotatably connecting each of said first and second pendulums to said support, said flexure for each pendulum defining first and second hinge axes, respectively, said first and second hinge axes being disposed at said opposing ends of said support and further defining first and second pendulous axes between the hinge axis and the center of mass of each of the pendulums, said first and second pendulous axes being at a predetermined angular offset relative to the plane of the support;

a first force transducer connected between said support and said first pendulum; and a second force transducer connected between said support and said second pendulum in a push-pull relationship, said first and second force transducers being connected, both being connected to at least one end of said support.

9. The accelerometer of claim 8, wherein said first and second force transducers are vibrating beam transducers.

10. The accelerometer of claim 9, further including means for preventing torsional movement relative to said pendulous axes.

11. The accelerometer of claim 10, wherein said preventing means includes struts.

12. The accelerometer of claim 11, wherein said struts are disposed adjacent ends of said first and second pendulums opposite their respective first and second hinge axes.

13. The accelerometer of claim 8, wherein both of said first and second force transducers span at least one of said first or second hinge axes.

14. The accelerometer of claim 8, wherein both of said first and second force transducers are disposed adjacent at least one of said first or second hinge axes.

15. In a micromachined push-pull accelerometer formed from a general planar silicon substrate having upper and lower surfaces and defining opposing ends which includes a first pendulum rotatably connected to the lower surface by at least one flexure formed in a first plane of said substrate defining a first hinge axis, said first hinge axis disposed adjacent one or the other of said opposing ends of said support and a first force transducer formed in a second plane connected between an upper surface of said substrate and said pendulum defining a sensitive axis that is angularly offset from an axis perpendicular to the plane of the substrate, the improvement comprising:

a second pendulum and a second force transducer formed in said second plane and at least one flexure formed in said first plane defining a second hinge axis for rotatably connecting said second pendulum to said support, said second hinge axis disposed adjacent to an end opposite said first hinge axis, wherein said first transducer is connected between said first pendulum and said support and said second transducer is connected between said second pendulum and said support in a push-pull configuration, said first and second transducers both connected to at least one end of said support.

16. The accelerometer recited in claim 15, wherein said first plane is in a layer of the substrate adjacent its bottom surface.

17. The accelerometer recited in claim 16, wherein said first and second hinge axes are spaced apart.

18. The accelerometer as recited in claim 17, wherein said first force transducer is connected between said substrate and a side of said first pendulum adjacent said first hinge axis and said second force transducer is connected between said substrate and said second pendulum on a side opposite said second hinge axis.

19. The accelerometer as recited in claim 18, wherein both of said first and second force transducers span at least one of said first and second hinge axes.

20. The accelerometer as recited in claim 18, wherein both of said first and second force transducers are disposed adjacent at least one of said first or second hinge axes.

* * * * *